Inventors
GEORGE F. CRAVEN
ANTONI E. KARBOWIAK

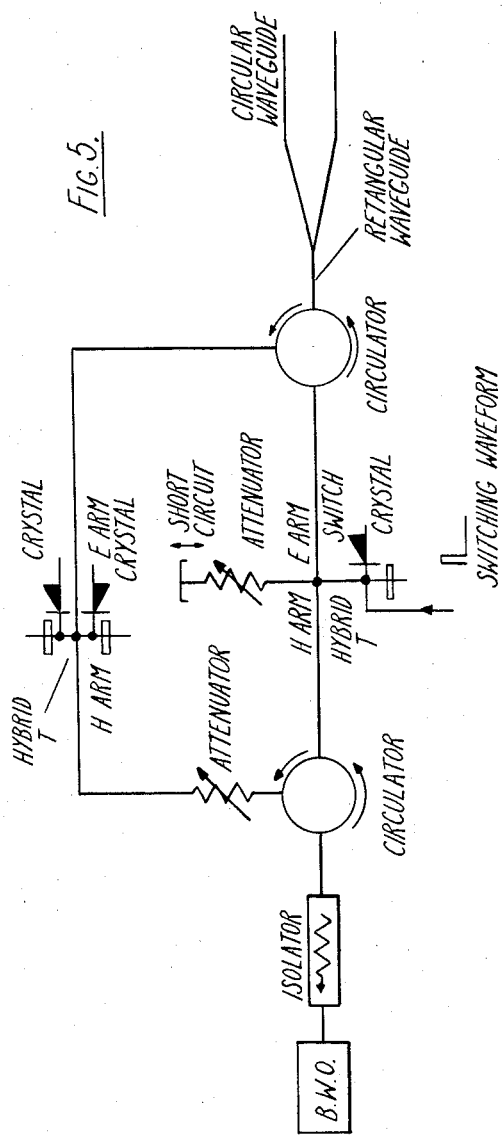

United States Patent Office 3,244,978
Patented Apr. 5, 1966

3,244,978
APPARATUS FOR THE DETERMINATION OF ATTENUATION IN WAVEGUIDES INCLUDING MEANS FOR COMPARING THE AMPLITUDES OF PULSE REFLECTIONS
George Frederick Craven and Antoni Emil Karbowiak, London, England, assignors to International Standard Electric Corporation, New York, N.Y., a corporation of Delaware
Filed July 16, 1962, Ser. No. 209,893
Claims priority, application Great Britain, Sept. 7, 1961, 32,202/61
12 Claims. (Cl. 324—58)

This invention relates to apparatus for the determination of attenuation in waveguides, utilizing millimicrosecond pulses in a multiple reflection test.

One method of determining the attenuation is by loosely coupling a magnetron to a short circuited length of waveguide and observing on an oscilloscope the decay rate of the recurrent pulses. The enormous bandwidth which must be covered constitutes a major difficulty because several thousand measurements are necessary if the waveguide is to be adequately tested.

According to the invention apparatus for the determination of the attenuation in waveguides includes means for applying to the waveguide a series of signal pulses of successively different frequencies, means for automatically comparing the relative amplitudes of successive pulse reflections at each signal frequency.

According to one feature of the invention such apparatus includes an oscillator modulated to provide alternately two different frequencies, a signal frequency and a local oscillator frequency.

According to a further feature of the invention such apparatus includes means for separating two successive pulse reflections into individual channels, means for converting the pulse reflections in each channel into relative voltage values at a common frequency for comparison by a ratio meter.

Figure 1:
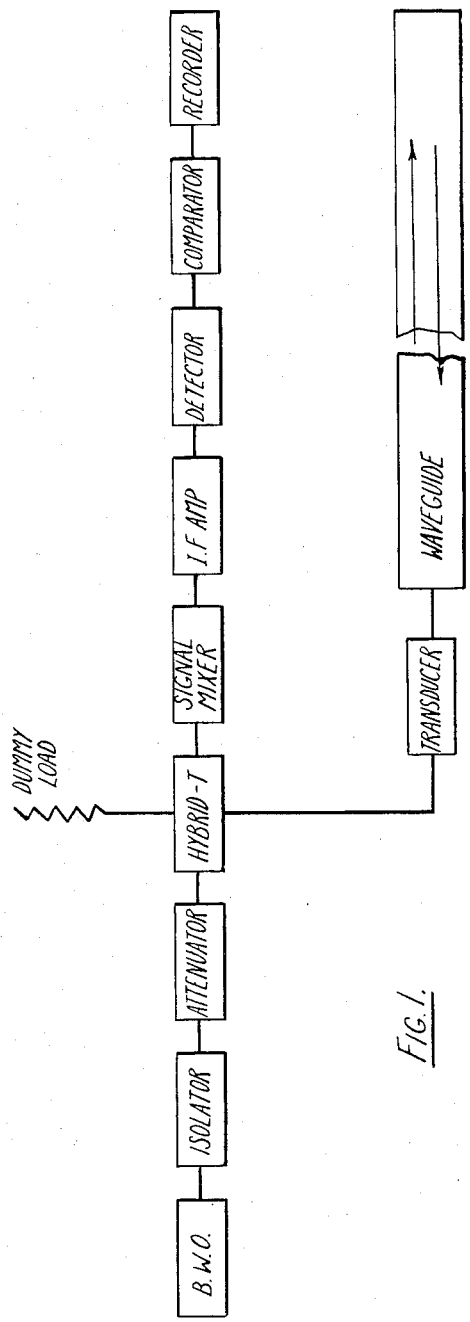
Figure 2:
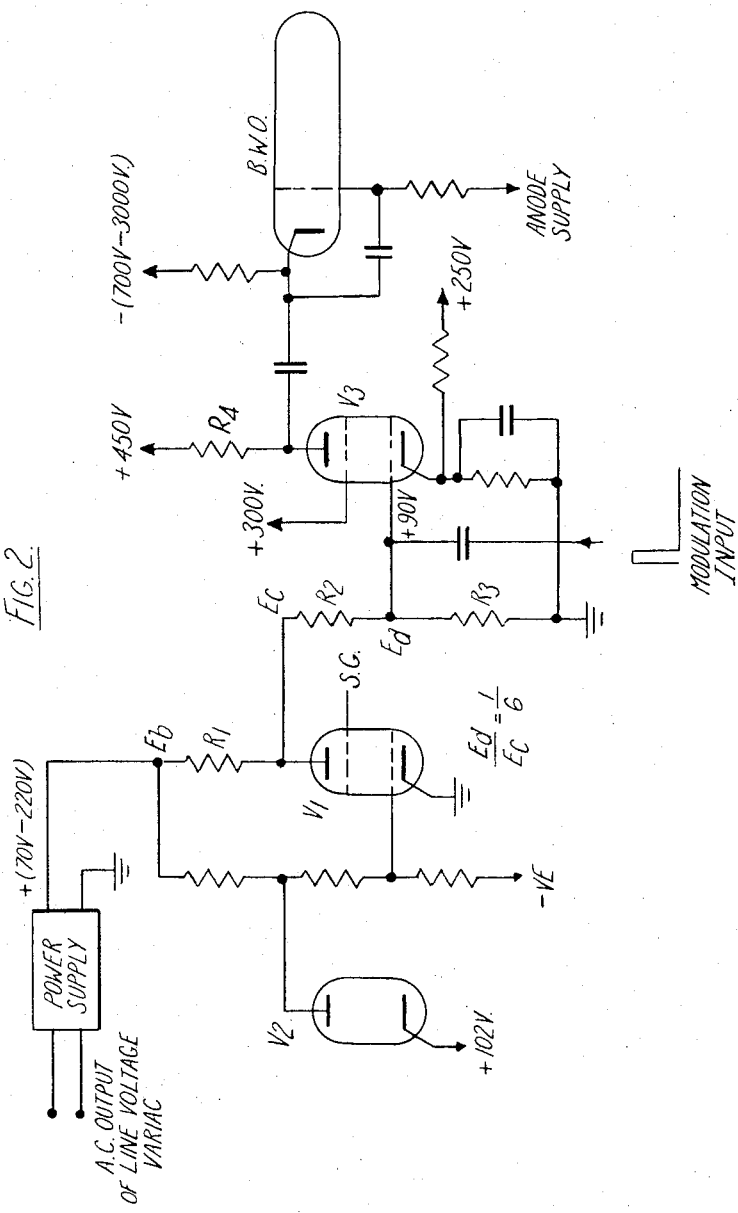
Figure 3:
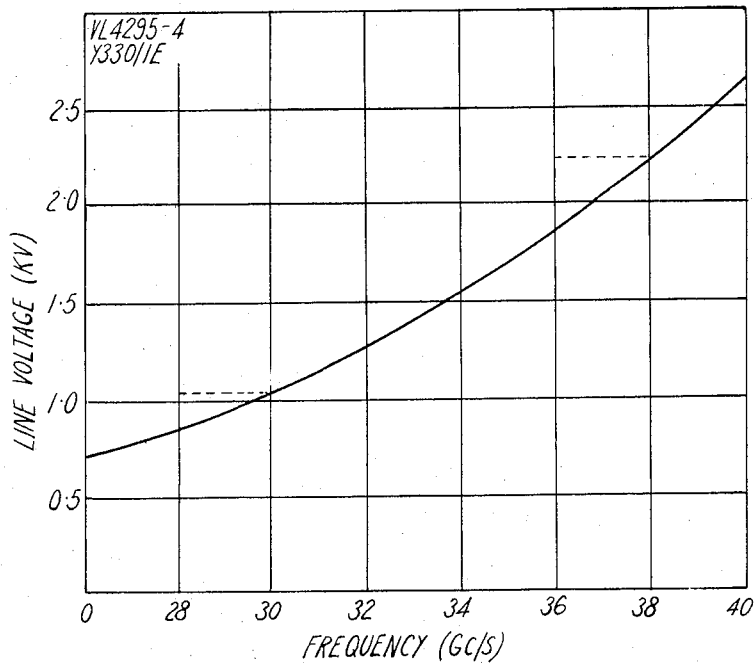
Figure 4:
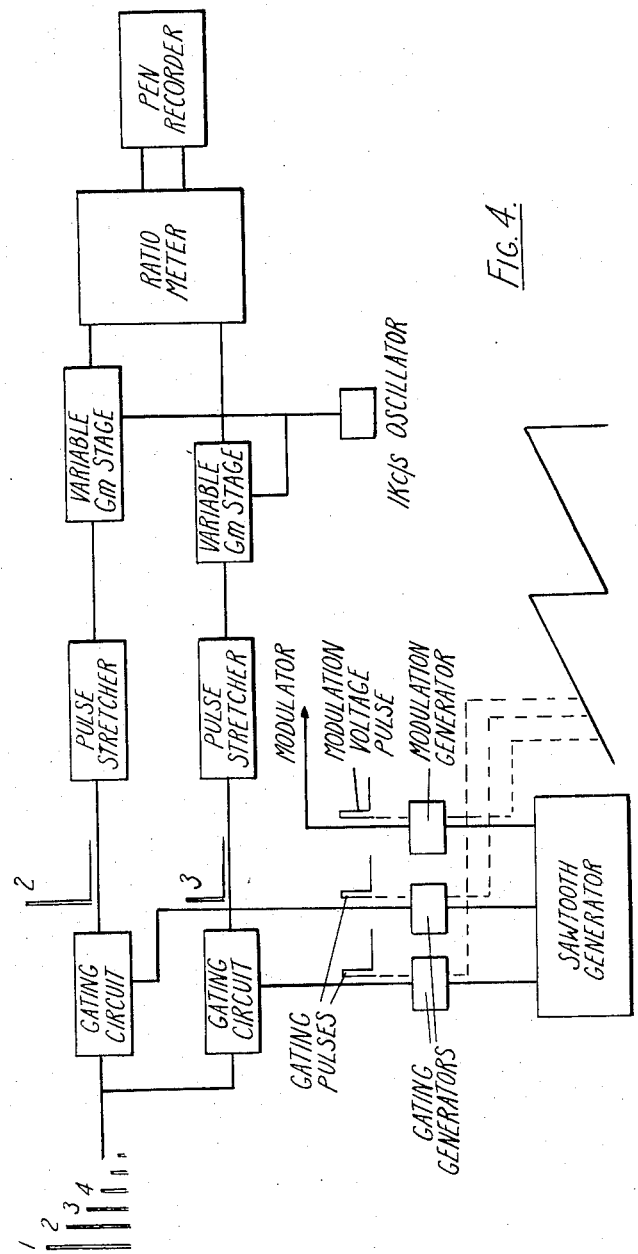

In order that the invention may be more clearly understood specific examples of the apparatus are now described with reference to the accompanaying drawings, in which FIG. 1 is a schematic of one form of the apparatus, and FIG. 2 is a simplified circuit illustrating the modulation of the oscillator, and FIG. 3 is a graph of the line voltage/frequency characteristic of a backward wave oscillator, and FIG. 4 is a schematic of the gating and comparator section of the apparatus, and FIG. 5 is a schematic of an alternative arrangement for coupling the apparatus to the waveguide.

In the apparatus depicted in FIG. 1 a backward wave oscillator is modulated to provide both the signal frequency source and the local oscillator frequency for the intermediate frequency amplifier. These two frequencies travel via the hybrid-T to the transducer, which feeds the waveguide under test through an inductive diaphragm. The hybrid-T is arranged to prevent the above two frequencies reaching the signal-mixer directly. The inductive diaphragm is of such dimensions that the power coupled into the waveguide is 10 db–20 db below the power incident on the diaphragm. This fulfills the requirement that the signal frequency must be loosely coupled to the waveguide under test if the attenuation of the latter is to be measured accurately. The diaphragm also reflects local oscillator power back via the hybrid-T to the signal mixer. The signal frequency reaches the signal mixer by the same path as the local oscillator, except that it consists of the power extracted from the waveguide through the diaphragm. It is delayed in time by its passage up and down the test waveguide and consists of multiple pulse reflections. The isolator blocks the pulse reflections from returning to the oscillator. The pulse reflections then pass through the intermediate frequency amplifier, the detector stage, and are fed into the comparator network where two successive pulses are automatically selected and the ratio between their relative amplitudes is determined. This ratio is recorded by a pen recorder.

In operation such apparatus is used to determine the waveguide attenuation over a large range of signal frequencies. A typical range passes from 30 kmc./s. to 70 kmc./s., and measurements may be made continuously throughout this range. As, however, the bandwidth of any particular backward wave oscillator may not exceed 20 kmc./s. it may be necessary to use three such oscillators to cover the complete range.

A backward wave oscillator is modulated by applying to the frequency sensitive electrode thereof a line voltage. As this voltage is raised so the frequency of the oscillator is raised. This frequency is hereinafter referred to as the local oscillator frequency. Short rectangular pulses of a radio frequency voltage, hereinafter referred to as the modulation voltage, are superimposed on the line voltage. The effect of the modulation voltage is to alter the frequency of the oscillator for the duration of each pulse; after which the oscillator will revert to the local oscillator frequency as determined by the line voltage. The frequency of the oscillator when modulated by the modulation voltage pulses is hereinafter referred to as the signal frequency. The difference between the local oscillator frequency and the signal frequency is dependent on the difference in amplitude between the initial line voltage and the combined line voltage and modulation voltage. Since the local oscillator frequency is combined with the signal frequency to provide the intermediate frequency in the intermediate frequency amplifier, the difference between the two frequencies must be maintained constant. However, in order to operate the apparatus in the manner envisaged, that is to complete approximately 4,000 measurements in a matter of less than an hour, it is necessary to sweep the oscillator through its entire bandwidth, and at the same time maintain the constant difference between the two frequencies, whilst the relative pulse reflection amplitudes are automatically compared by the comparator circuits. This is achieved by controlling the amplitude of the modulation voltage through a circuit which is linked indirectly to the line voltage supply. Such a circuit is depicted in FIG. 2.

Comparatively short pulses are involved if the attenuation of short lengths of pipe is to be measured. A minimum length of about 100 ft. requires practical pulse widths of about 0.1 $\mu$sec. Modulation of the line electrode in the backward wave oscillator is achieved indirectly by modulating both cathode and anode. These electrodes with their associated circuitry present a comparatively high capacitance, necessitating a low impedance modulator. The pulse amplitude needed (for an intermediate frequency of 150 m./cs.) varies from about 15 to 45 volts throughout the frequency range, the voltage being developed across a 100 ohm load R4 in the modulator anode circuit V3. Amplitude control is achieved by biasing the modulator circuit V3 well beyond cut-off and adding an incremental change of bias derived from the line voltage circuit. The line voltage —(700 v.– 300 v.) is derived from a variable transformer (not shown) connected to the A.C. mains. This transformer also powers the +(70 v.–220 v.) supply of the modulator control circuit. Therefore variation of the line voltage to the backward wave oscillator is accompanied by a proportional variation of the power supply voltage to the modulation control circuit.

In this circuit as illustrated in FIG. 2 a potential divider R2, R3 permits division by a constant and allows a suitable H.T. voltage for the valve used. The H.T. voltage and dividing network values are chosen so that the desired modulator grid curve is obtained at the high voltage end of the graph shown in FIG. 3.

Reference to FIG. 3 will show that for a constant difference between the local oscillator frequency and the signal frequency the ratio between the modulating pulse amplitude and the line voltage must increase as the frequency of the backward wave oscillator increases. If the circuit is therefore arranged to provide the correct difference at the high voltage end of the graph the rate of change of the high tension voltage is then too great at the low voltage portion of the graph. This is remedied by the inclusion of a pentode valve V1 with a series load R1, part of the bias for the valve being derived from its anode circuit. The bias is effectively clamped at the high anode voltages by the diode V2 in the anode grid circuit. The pentode V1 then behaves as a constant-current load and this part of the modulator grid bias curve is unaffected. At the lower voltages, however, the diode V2 ceases to conduct and the positive contribution to the bias decreases, the consequent decrease in current then reduces the voltage drop through the anode resistor R1. The slope of the curve decreases as the lower end of the characteristic is approached, with appropriate values, the desired modulator bias curve can be closely approximated.

With the above circuit satisfactory tracking between local oscillator and signal frequencies is obtained and single knob control throughout the backward wave oscillator tuning range is possible. Manual or automatic tuning may be adopted.

Basically, the attenuation of the waveguide is determined by comparing the relative amplitudes of any succeeding signal pulses in the received train. This may be done by the use of a commercially manufactured ratiometer designed to accept signals of 1000 c./c. within the amplitude range 0.3 mv.–10 mv. and this requirement is satisfied by the gating and comparator circuits to be described with reference to FIG. 4.

The train of pulses from the waveguide is applied to the parallel inputs of two identical gating circuits. The latter are valves which are biassed to cut-off in the quiescent condition, output appearing at the anode only when a signal pulse coincides with a square wave gating pulse applied to the suppressor grid. The time at which the square wave generator is triggered is variable and thus any desired pulse may be selected. The output of the gating circuits are then fed to identical pulse stretcher circuits, which are diodes with a large time-constant in the cathode, driven by a low impedance source. This ensures that the peak amplitudes at the cathodes are very nearly equal to the pulse peak amplitudes at the anodes. The cathode time constant is chosen so that the decay in between pulses is only a few percent of the peak value and that with a small amount of additional filtering is substantially a D.C. component approximating the peak value of the pulse input at the diode anodes. The resulting D.C. components are then applied to the grids of identical variable $\mu$ valve stages in series with the output of a 1,000 c./s. oscillator. The symbol "$\mu$" as used here is defined in the publication "Theory and Applications of Electron Tubes" by Herbert J. Reich, published by McGraw-Hill Book Company, Inc., New York, 1944 on page 51. Thus the 1,000 c./s. outputs of these stages are functions of the pulse amplitude inputs.

The waveform generator circuits for the gating circuits are the same as those used for the modulation voltage pulses applied to the backward wave oscillator in FIG. 2. A convenient generator is a Miller-integrator saw-tooth generator. Variable timing is achieved by an adjustable bias applied to the cathode of a diode connected across the saw-tooth output. The moment at which the diode begins to conduct then provides the variable time trigger-pulse. The repetition period of the saw-tooth generator is 0.5 msec.–1.0 msec. This is considerably in excess of the maximum delay needed for measuring for example in a circular waveguide excited in the $H_{01}$ mode the waveguide attenuation (100 $\mu$sec. for 20 miles, the maximum distance at which a signal is measurable). The cathode bias settings employed on the diodes are such that "zero delay" (i.e. both gating generators and modulator generator firing at the same time) correspond approximately to the centre of the saw-tooth waveform. This gives a useful degree of flexibility in the choice of delay. For instance, at a fixed signal frequency it is useful to check the amplitude ratio of many adjacent pulses in the received train. Although, theoretically, the decay rate is exponential, sometimes mode inter-action effects cause some departure from this law. A check on this behaviour can readily be made by setting the gating generators to the desired differential interval and advancing the firing time (decreasing the cathode bias) of the modulator generator departures from the exponential law can then be measured.

An alternative method of coupling the apparatus to the waveguide is illustrated in FIG. 5. A fast microwave switch operated by the modulating pulse directs, with the aid of two circulators, the signal frequency pulse and the local oscillator frequency along the appropriate paths. The switch is closed during the signal frequency generation, the output appearing at the E arm where it travels through the second circulator to the waveguide feed system, the latter being loosely coupled to the waveguide. The train of reflected pulses then returns through the feed circuit and the second circulator to the balanced mixer circuit. During the local oscillator period the switch is open and local oscillator power is reflected back to the first circulator where it travels to the local oscillator arm of the balanced mixer circuit.

What we claim is:

1. Apparatus for the determination of attenuation in waveguides including means for applying to the waveguide a series of signal pulses of successively different frequencies, means for automatically comparing the relative amplitude of successive pulse reflections at each signal frequency, said comparing means including means for separating any two pulse reflections of each signal pulse into individual channels and means for converting the pulse reflections in each channel into relative voltage values at a common frequency for comparison by a ratio meter, and means for permanently recording the ratio of the relative amplitudes.

2. Apparatus according to claim 1 in which the means for separating two pulse reflections into individual channels comprises first and second gating circuits, means for applying separate gating pulses to each gating circuit whereby they are caused to pass signal pulse reflections coinciding with the gating pulses, and means for generating two gating pulse trains, one train for each gating circuit, one such train being delayed for a period of time equal to the time delay between two successive pulse reflections.

3. Apparatus according to claim 1 in which the means for converting the pulse reflections in each channel into relative voltage values at a common frequency comprises for each channel a pulse stretcher circuit, the output therefrom being applied to the grid of a variable $\mu$ tube in series with the output from a fixed frequency oscillator, the output from the fixed frequency oscillator being common to both channels.

4. Apparatus according to claim 2 in which the means for generating the two gating pulse trains comprises a pair of gating pulse generators each triggered by a trigger pulse derived from a diode connected across the output a saw-tooth generator, variable timing of the trigger pulses being achieved by applying an adjustable bias to the cathode of each diode.

5. Apparatus according to claim 1 including an oscillator modulated to provide alternately two different frequencies, a signal frequency and a local oscillator frequency.

6. Apparatus according to claim 5 in which the oscillator is a backward wave oscillator modulated by applying to the frequency sensitive electrode thereof a line voltage, means being provided whereby short rectangular pulses of a radio frequency voltage are superimposed on the line voltage.

7. Apparatus according to claim 6 in which the line voltage and the supply voltage in the radio frequency voltage control circuit are both derived from the same variable transformer.

8. Apparatus according to claim 6 in which the radio frequency voltage control circuit includes in the power supply thereto a constant-current load arranged to decrease the power supply current when the supply voltage is reduced.

9. Apparatus according to claim 6 in which the radio frequency pulse generator is triggered by a trigger pulse derived from a diode connected across the output of the saw-tooth generator, variable timing of the trigger pulse being achieved by applying an adjustable bias to the cathode of the diode.

10. Apparatus for the determination of attenuation in waveguides including a backward wave oscillator modulated to provide alternately two different frequencies, a signal frequency and a local oscillator frequency, an isolator, an attenuator, means for coupling the signalling frequency output into the waveguide, means for coupling signal pulse reflections from the waveguide to a signal mixer stage, an intermediate frequency stage, a detector stage, means for separating any two signal pulse reflections into individual channels, means for converting the signal pulse reflections in each channel into relative voltage values at a common frequency, means for comparing the relative amplitudes of successive pulse reflections at each signal frequency.

11. Apparatus according to claim 10 in which the means for coupling comprises a hybrid-T junction arranged to pass both the signal frequency and the local oscillator frequency to a transducer associated with the waveguide, the transducer including an inductive diaphragm arranged to reflect the local oscillator frequency, the hybrid-T being arranged to pass the reflected signal frequency and the reflected local oscillator frequency to the signal mixer stage.

12. Apparatus according to claim 10 in which the means for coupling comprises a first circulator, switching means arranged to be closed during the signal pulse generation period, a second circulator and a balanced mixer network, the signal frequency output from the oscillator being passed through the circulators and the closed switch to the waveguide during the signal pulse generation period, the local oscillator frequency output being reflected by the switch when the latter is open and being directed by the first circulator to the balanced mixer circuit, the reflected signal pulses from the waveguide being directed by the second circulator during the same period to the balanced mixer circuit.

References Cited by the Examiner

UNITED STATES PATENTS

| 2,602,834 | 7/1952 | Leslie | 324—52 |
| 2,649,570 | 8/1953 | Radcliffe | 324—58.5 X |
| 2,925,556 | 2/1960 | Schimmel | 324—95 |
| 2,931,900 | 4/1960 | Goodman | 324—58 X |
| 3,107,329 | 10/1963 | McSkimin | 324—58 |
| 3,114,875 | 12/1963 | Haagensen | 324—58 X |

OTHER REFERENCES

"Direct VSWR Readings," article in Electronics, December 1954, pages 162–165.

"Improved Sweep Frequency Techniques for Broadband Microwave Testing," article in the Hewlett-Packard Journal, December 1960, vol. 12, No. 4.

WALTER L. CARLSON, *Primary Examiner.*